US012644529B2

(12) United States Patent
Hsu

(10) Patent No.: US 12,644,529 B2
(45) Date of Patent: Jun. 2, 2026

(54) PRESSURE RELIEF TOOL FOR A LARGE-SIZE TIRE

(71) Applicants: CREATE FOREVER INDUSTRIAL CO., LTD., Changhua County (TW); Lung-Kuo Hsu, Changhua County (TW)

(72) Inventor: Lung-Kuo Hsu, Changhua County (TW)

(73) Assignees: Lung-Kuo Hsu, Changhua County (TW); CREATE FOREVER INDUSTRIAL CO., LTD., Changhua County (TW)

( * ) Notice: Subject to any disclaimer, the term of this patent is extended or adjusted under 35 U.S.C. 154(b) by 0 days.

(21) Appl. No.: 18/891,020

(22) Filed: Sep. 20, 2024

(65) Prior Publication Data

US 2025/0251050 A1 Aug. 7, 2025

(30) Foreign Application Priority Data

Feb. 7, 2024 (TW) ................................. 113105044

(51) Int. Cl.
*F16K 17/00* (2006.01)
(52) U.S. Cl.
CPC .................................. *F16K 17/00* (2013.01)
(58) Field of Classification Search
CPC ...... F16K 17/00; B60S 5/04; Y10T 137/3584; Y10T 137/3662; Y10T 137/3677; B60C 29/068; B60C 23/0496
USPC ................................................ 137/227–230
See application file for complete search history.

(56) References Cited

U.S. PATENT DOCUMENTS

| | | | | |
|---|---|---|---|---|
| 4,276,898 A | * | 7/1981 | Ross | B29C 73/166 |
| | | | | 137/315.04 |
| 6,253,436 B1 | * | 7/2001 | Barjesteh | B25B 27/24 |
| | | | | 29/213.1 |
| 6,612,005 B2 | * | 9/2003 | Rivers | B25B 27/24 |
| | | | | 81/15.4 |

(Continued)

FOREIGN PATENT DOCUMENTS

| | | | | |
|---|---|---|---|---|
| DE | 102019119442 A1 | * | 2/2020 | B60C 29/06 |
| TW | 201507883 A | * | 3/2015 | |
| TW | 202126441 A | * | 7/2021 | |

OTHER PUBLICATIONS

Machine Translation of TW1878022B retrieved from espacenet. com (Year: 2025).*

*Primary Examiner* — Jessica Cahill
(74) *Attorney, Agent, or Firm* — Demian K. Jackson; Jackson IPG PLLC

(57) ABSTRACT

A pressure relief tool for a large-size tire is connected with an air valve of the large-size tire, and the pressure relief tool contains a fitting tube, a drive rod, a valve joint, a slidable sleeve, a grip element, and an operational element. The fitting tube includes a first segment, a second segment, an air conduit, and a coupling portion. The drive rod is reciprocally moveable and rotatable between a first position and a second position of the fitting tube. The valve joint includes a connection seat, an air stop ring, at least one movable retainer, and at least one returning element. When the slidable sleeve is slid to correspond to a corresponding air orifice of at least one air orifice, an air pressure gauge is communicated with the at least one air orifice so as to measure an air pressure value of an interior of the large-size tire.

9 Claims, 9 Drawing Sheets

(56) References Cited

U.S. PATENT DOCUMENTS

| | | | | |
|---|---|---|---|---|
| 6,929,020 B1 * | 8/2005 | Rogers | .................... | F16K 15/20 |
| | | | | 137/232 |
| 9,278,439 B1 * | 3/2016 | Krause | .................... | B25B 27/24 |
| 9,375,985 B2 * | 6/2016 | Hennig | .................... | G05D 7/03 |
| 10,478,953 B2 * | 11/2019 | Green | .................... | B25B 27/24 |
| 2009/0188570 A1 * | 7/2009 | Lin | .......................... | B60S 5/04 |
| | | | | 137/231 |
| 2015/0330525 A1 * | 11/2015 | Wang | .................... | F16K 15/20 |
| | | | | 137/231 |
| 2016/0272167 A1 * | 9/2016 | Zalzalah | ................. | F16L 37/28 |

* cited by examiner

PRESSURE RELIEF TOOL FOR A LARGE-SIZE TIRE

TECHNICAL FIELD

The present invention relates to a pressure relief tool, and more particularly to the pressure relief tool which is applicable for a large-size tire.

BACKGROUND

A conventional tire pressure required for vehicles with a large-size tire will be different because of changes in the environment and vehicle status. When the driving environment of a vehicle with a large-size tire changes from highway to off-road, the large-size tire needs to be depressurized to make the vehicle more comfortable. A pressure of the large-size tire is adjusted downward to a predetermined value so as to improve safety and comfort.

Relevant manufacturers have introduced a tire pressure relief device to quickly relieve tire pressure to a predetermined value. However, the operation process is prolonged and inconvenient. Not only must both hands be operated, but the tire pressure relief device must be connected to the front end and the rear end of the valve with an operation fixing device, thus having inconvenient, uncomfortable and troublesome operations.

The present invention has arisen to mitigate and/or obviate the afore-described disadvantages.

SUMMARY

The primary aspect of the present invention is to provide a pressure relief tool for a large-size tire by which a valve joint is connected with an air valve of the large-size tire to release the air pressure, and after releasing the air pressure of the large-size tire, the valve joint is removed from the air valve with one hand easily, an air pressure of the large-size tire is released to a predetermined value easily and quickly by using a fitting tube, a drive rod and a slidable sleeve, thus obtaining easy, time-saving, and labor-saving effects.

To obtain above-mentioned aspect, a pressure relief tool for a large-size tire provided by the present invention is connected with an air valve of the large-size tire, the air valve includes an air valve configured to control a flow of air of the large-size tire. The pressure relief tool contains:

a fitting tube including a first segment, a second segment opposite to the first segment, and an air conduit communicating with the first segment and the second segment. The fitting tube further includes at least one air orifice defined between the first segment and the second segment, and the fitting tube further includes a coupling portion formed on the first segment.

A drive rod is reciprocally moveable and rotatable between a first position and a second position of the fitting tube. The drive rod includes an operating portion with an end extending out of the second segment of the fitting tube, and the drive rod includes a taking portion formed on the other end thereof. When the drive rod is moved to the first position, the taking portion is connected with the air valve removed from or connected with the air valve, and when the drive rod actuates the air valve to locate at the second position, an interior of the large-size tire is in communication with an external environment via the air valve, the air conduit, and the at least one air orifice.

A valve joint includes a connection seat, an air stop ring, at least one movable retainer, and at least one returning element.

The connection seat has a first connecting orifice defined on an end thereof, a second connecting orifice formed on the other end of the connection seat, and a channel communicating between the first connecting orifice and the second connecting orifice. The first connecting orifice is configured to connect with the coupling portion of the fitting tube, and the second connecting orifice is configured to accommodate the air valve.

The air stop ring is received in the channel but does not block the first connecting orifice and the second connecting orifice, and the air stop ring is movable toward the first connecting orifice or the second connecting orifice in the channel. The air stop ring has a tunnel defined therein, and the air stop ring has an airtight portion extending outward therefrom and configured to close the channel.

The at least one movable retainer is rotatably connected on the end of the connection seat close to the second connecting orifice, at least one movable retainer has a toothed portion formed on an inner wall thereof, and the toothed portion is controllable to move between an internal position and an external position, the internal position is located in the channel, and the external position is located outside the channel.

The at least one returning element is configured to abut against the at least one movable retainer so that the toothed portion is normally maintained at the internal position, and when an actuation portion of the at least one movable retainer is controlled, the toothed portion of the at least one movable retainer is moved to the external position.

A slidable sleeve is slidably fixed on the fitting tube, and when the slidable sleeve is slid to correspond to a corresponding air orifice of the at least one air orifice, the air pressure gauge is communicated with the at least one air orifice so as to measure an air pressure value of the interior of the large-size tire.

DETAILED DESCRIPTION

Figure 1:
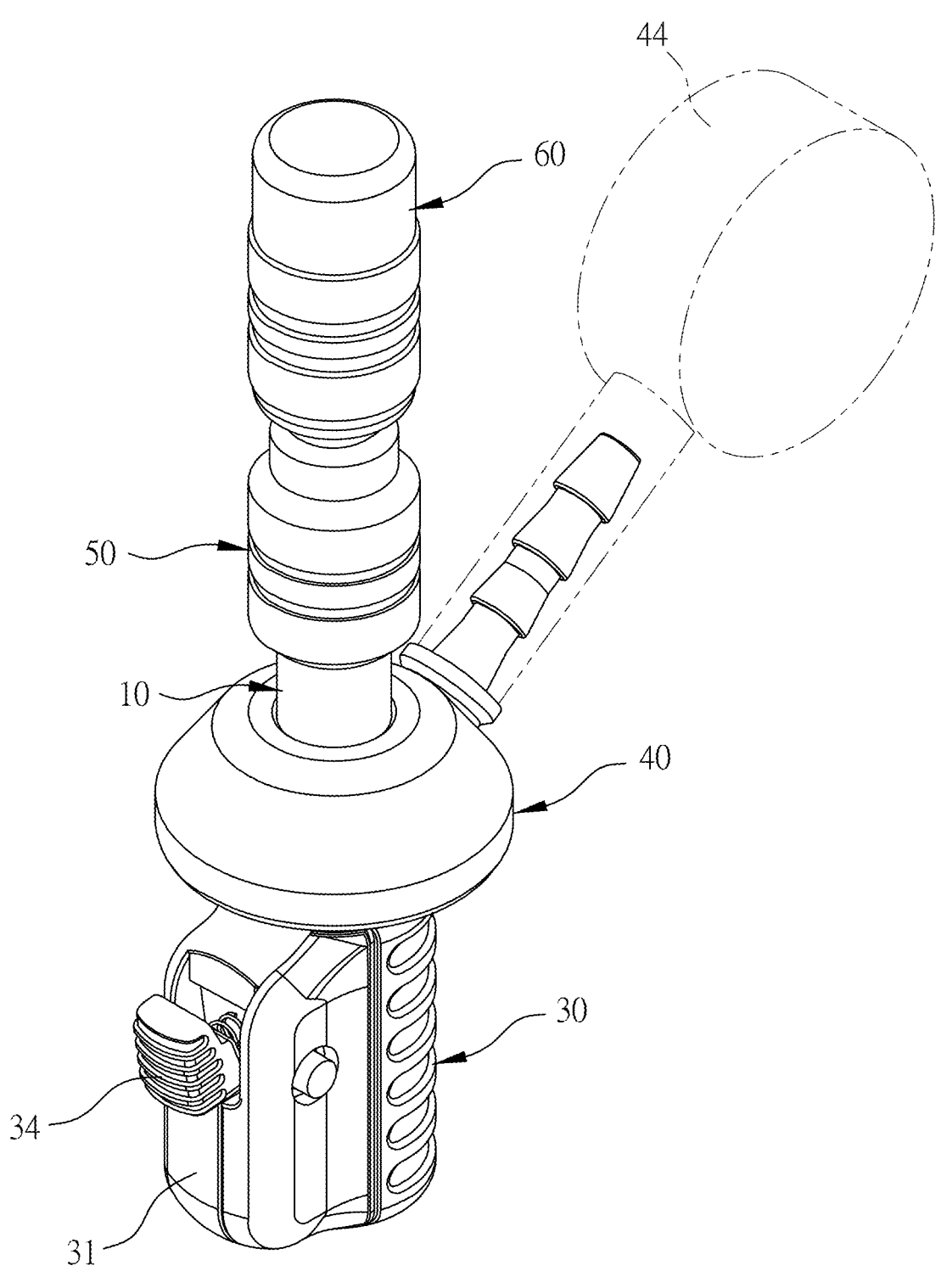
FIG. 1 is a perspective view showing the assembly of a pressure relief tool for a large-size tire according to a preferred embodiment of the present invention.
Figure 2:
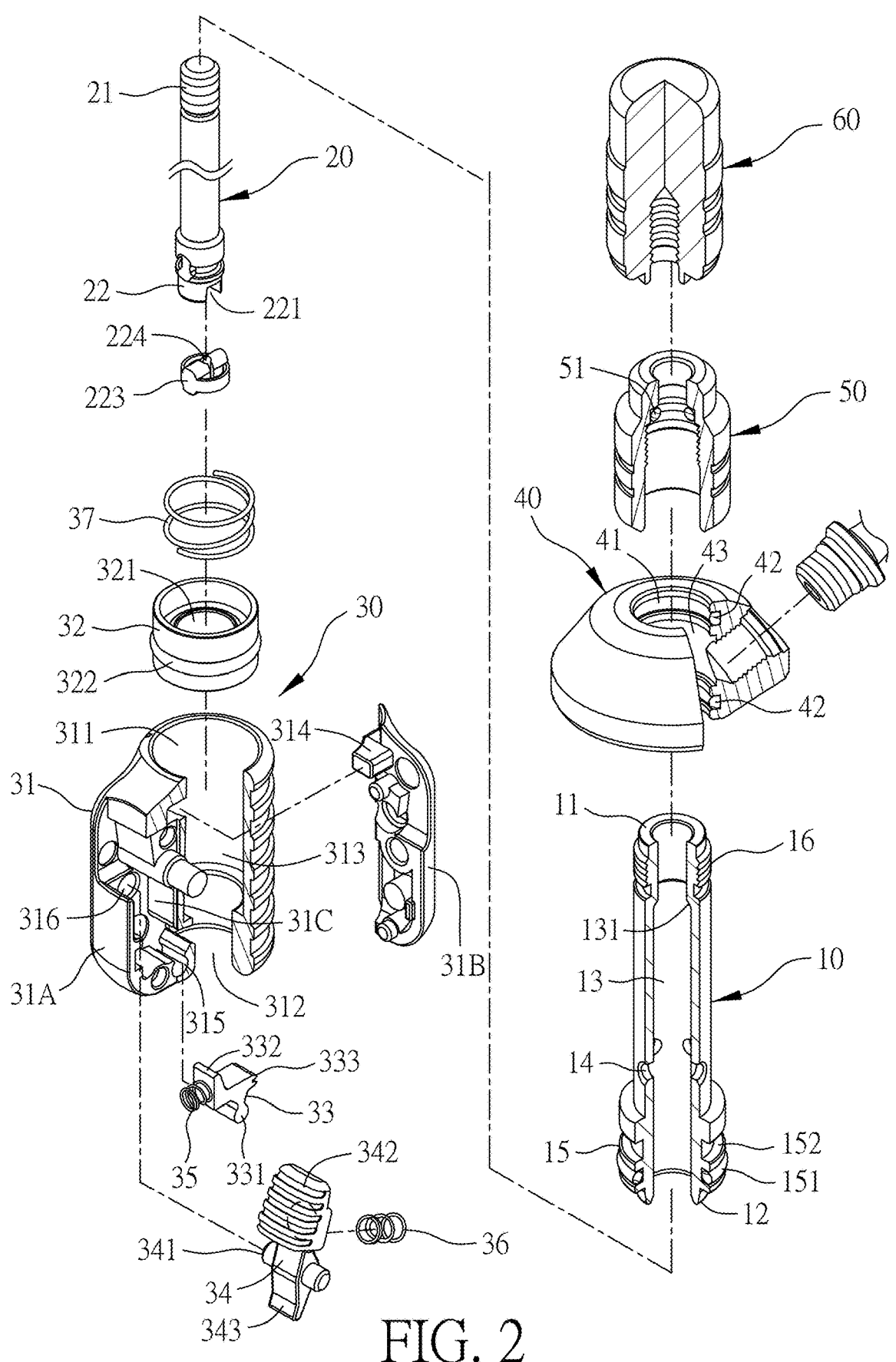
FIG. 2 is a perspective view showing the exploded components of the pressure relief tool for the large-size tire according to the preferred embodiment of the present invention.
Figure 3:
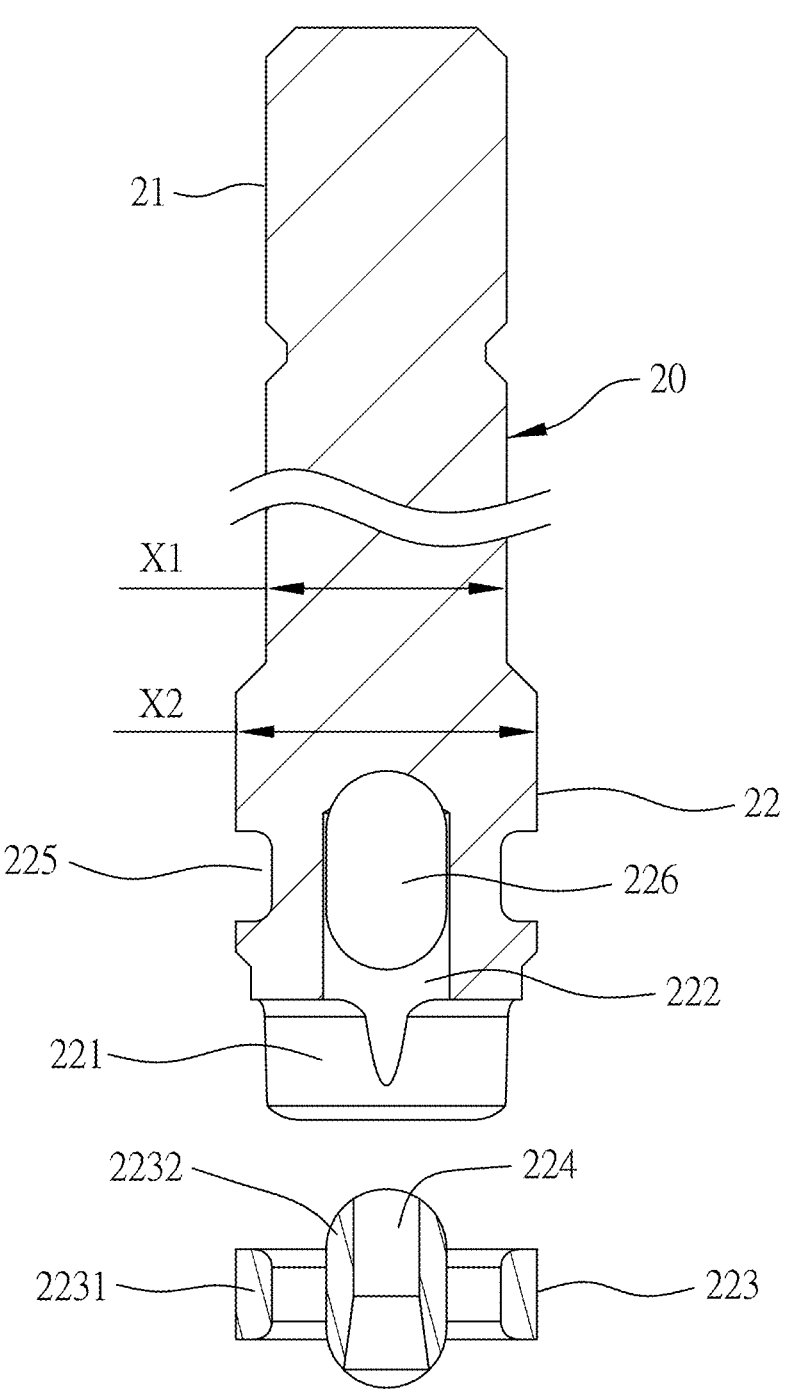
FIG. 3 is a cross-sectional view showing the exploded components of the drive rod of the pressure relief tool for the large-size tire according to the preferred embodiment of the present invention.

With reference to FIGS. 1-4, a pressure relief tool for a large-size tire according to a preferred embodiment of the present invention comprises a fitting tube 10, a drive rod 20, a valve joint 30, a slidable sleeve 40, a grip element 50, and an operational element 60.

The fitting tube 10 includes a first segment 11, a second segment 12 opposite to the first segment 11, and an air conduit 13 communicating with the first segment 11 and the second segment 12, wherein the air conduit 13 includes a defining portion 131 formed proximate to the second segment 12 and having a decreased diameter, the fitting tube 10 further includes at least one air orifice 14 defined between the first segment 11 and the second segment 12, and the at least one air orifice 14 is communicated with the air conduit 13, the fitting tube 10 further includes a coupling portion 15 formed on the first segment 11 and having a large diameter, wherein the coupling portion 15 has an O-ring 151 engaged on an outer wall thereof, and the coupling portion 15 has an annular groove 152 formed on the outer wall thereof, the fitting tube 10 includes a fixing portion 16 formed on the second segment 12. In this embodiment, four air orifices 14 are provided in this embodiment.

Figure 4:
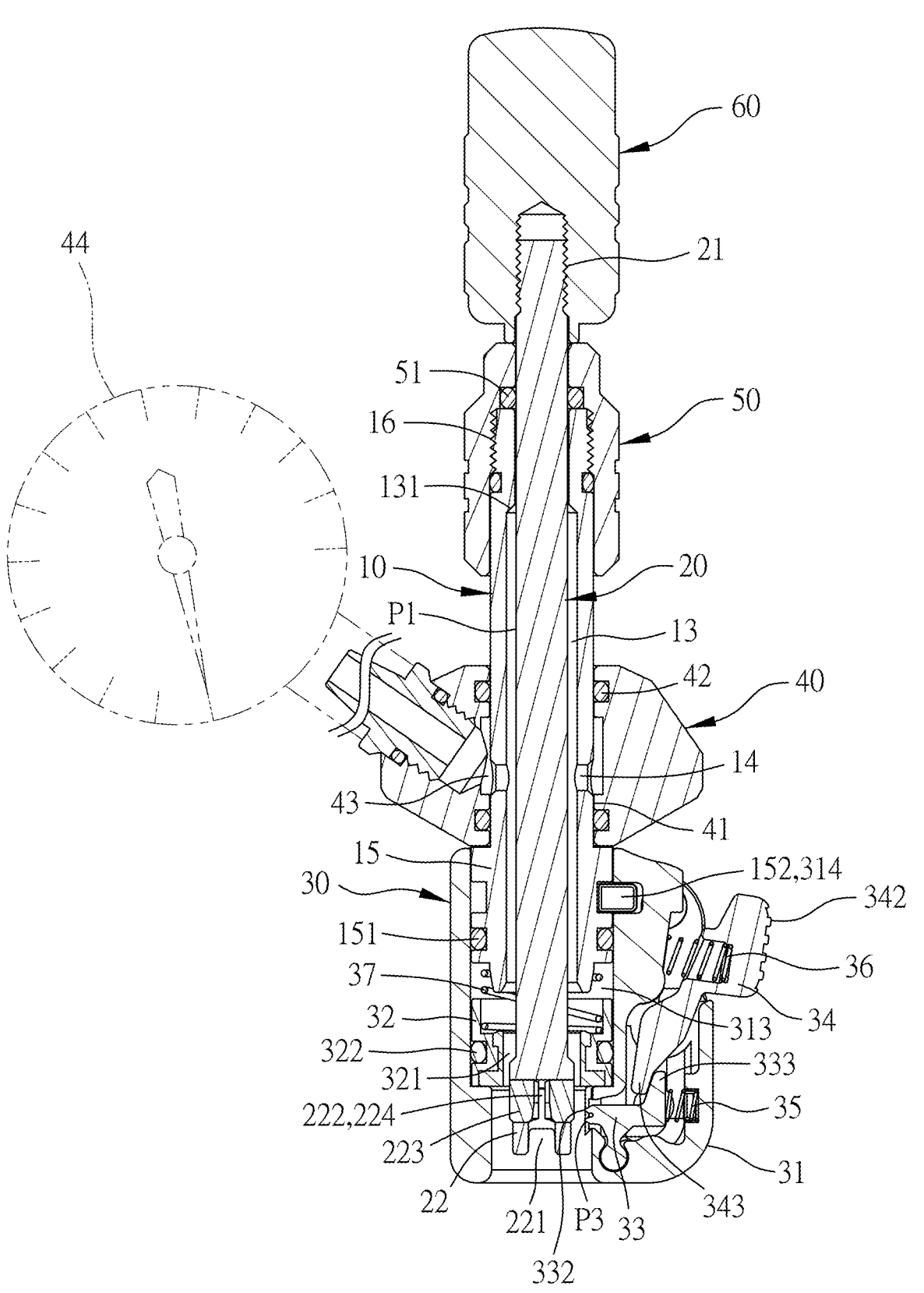
FIG. 4 is a cross-sectional view showing the assembly of the pressure relief tool for the large-size tire according to the preferred embodiment of the present invention.
Figure 5:
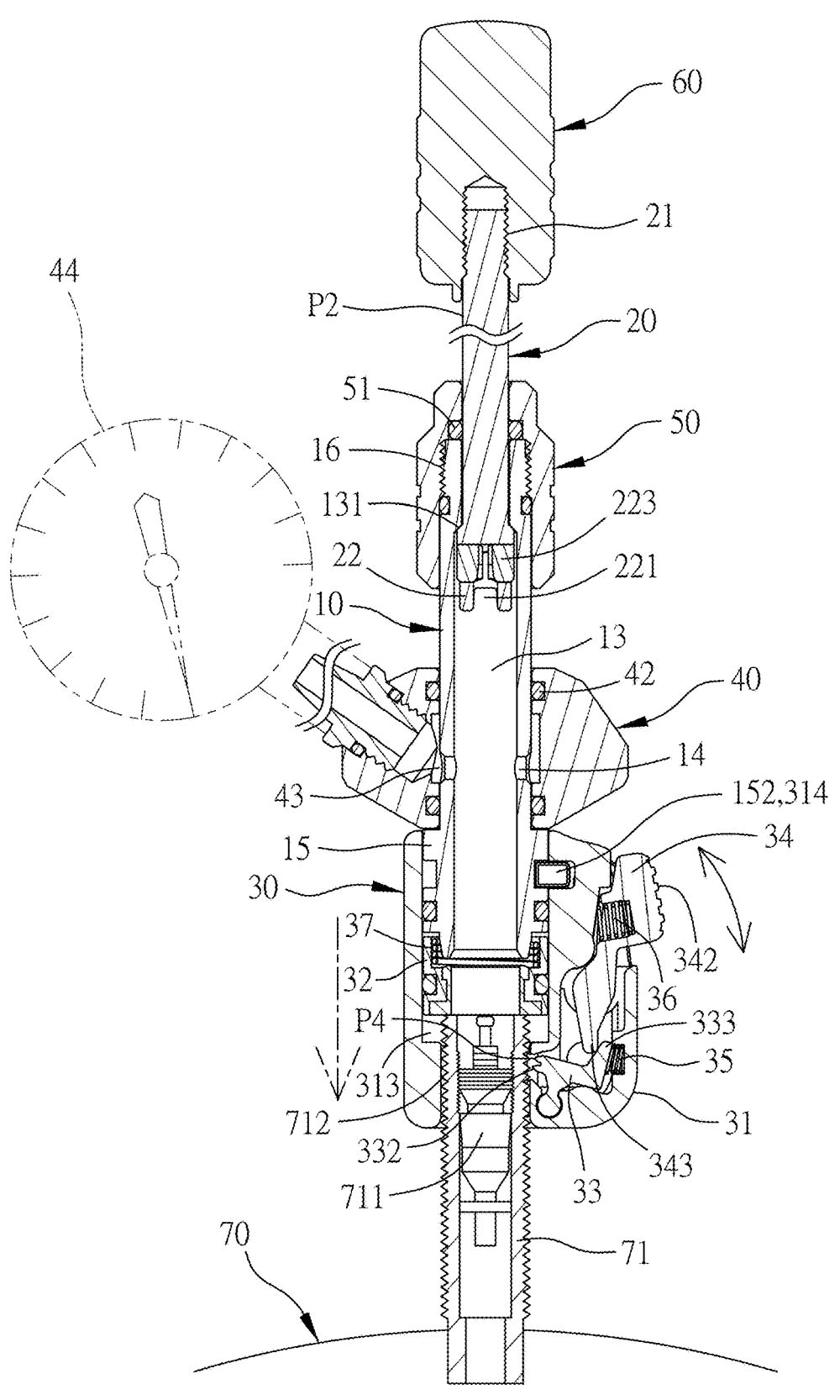
FIG. 5 is a cross-sectional view showing the operation of the pressure relief tool for the large-size tire according to the preferred embodiment of the present invention.
Figure 6:
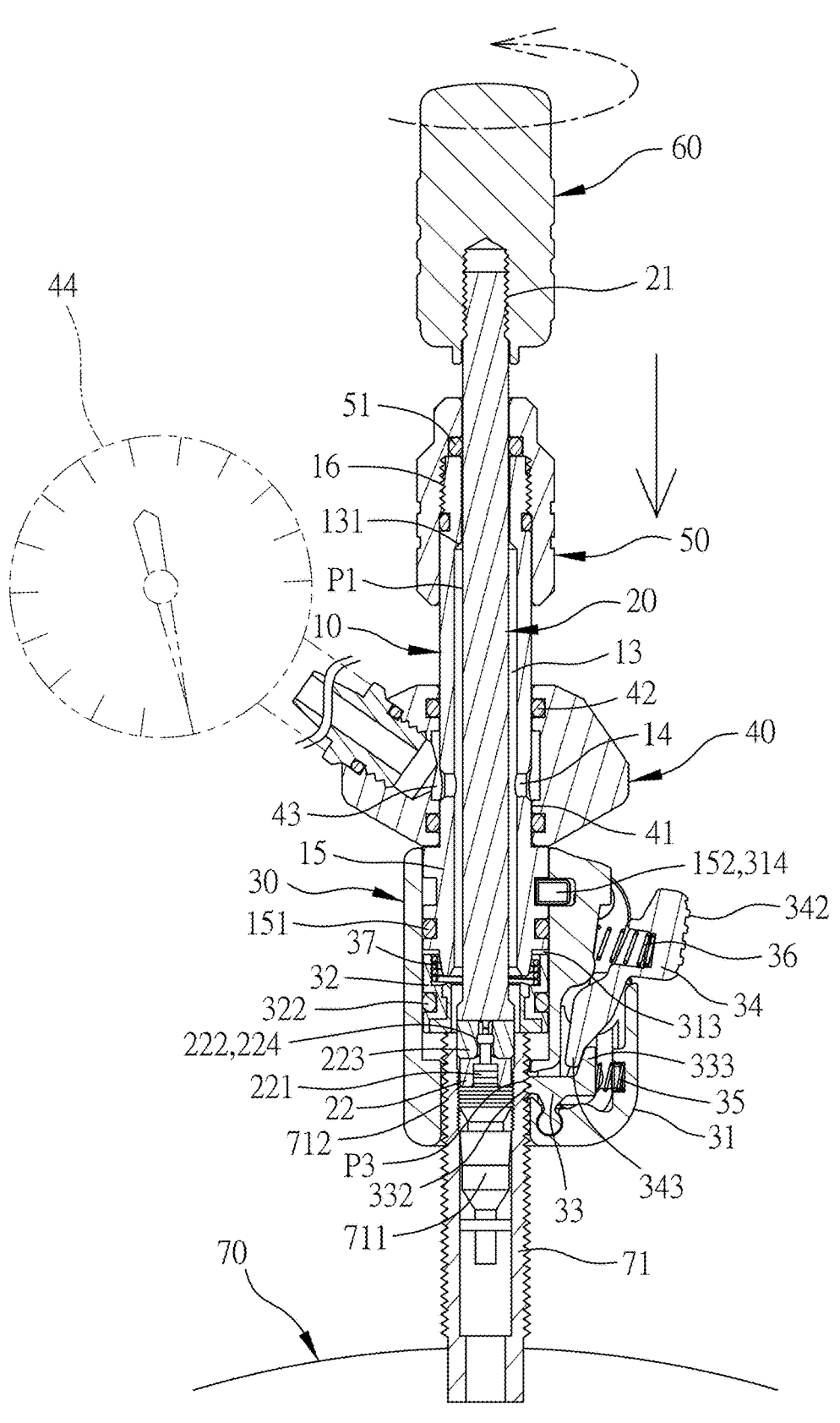
FIG. 6 is another cross-sectional view showing the operation of the pressure relief tool for the large-size tire according to the preferred embodiment of the present invention.
Figure 7:
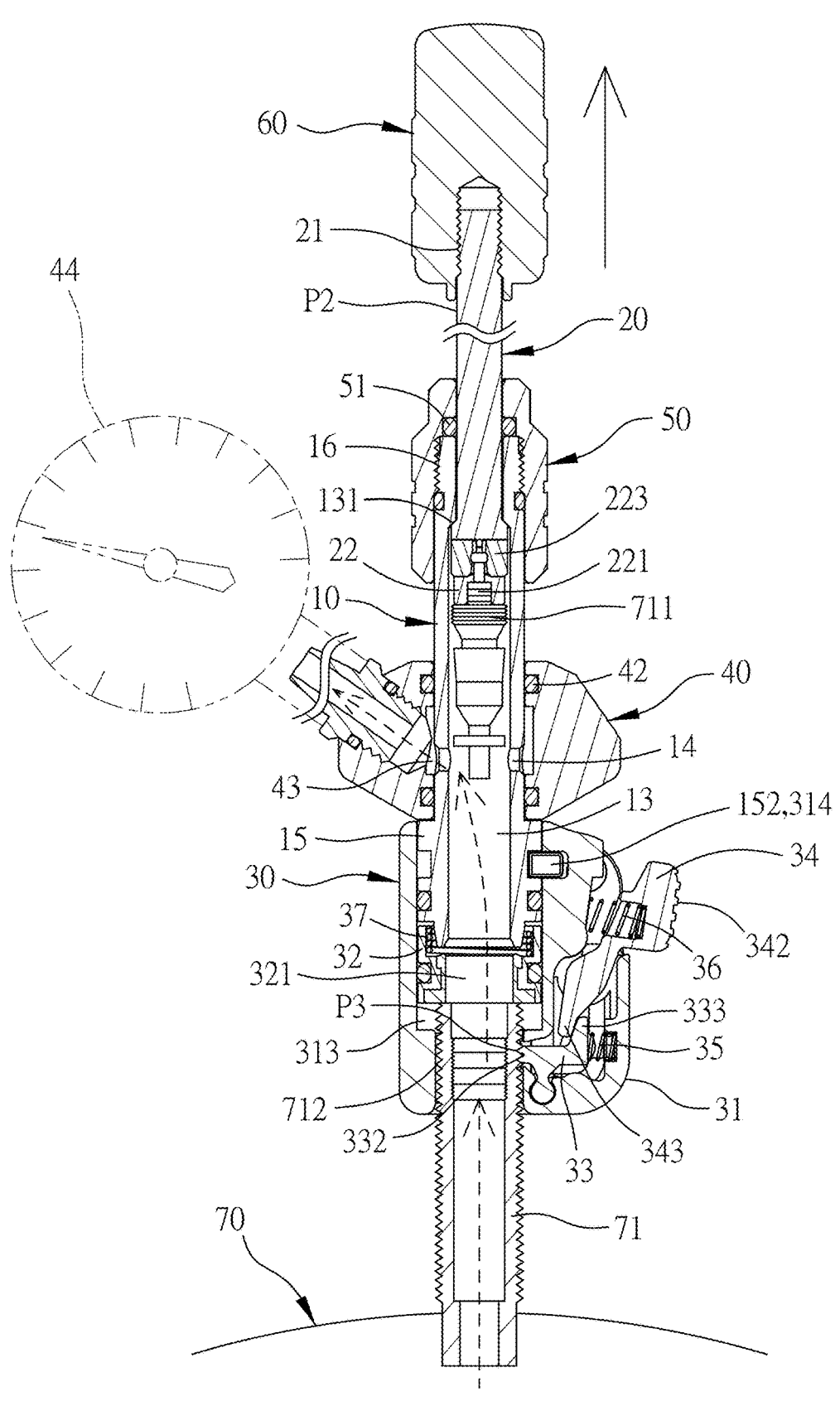
FIG. 7 is also another cross-sectional view showing the operation of the pressure relief tool for the large-size tire according to the preferred embodiment of the present invention.
Figure 8:
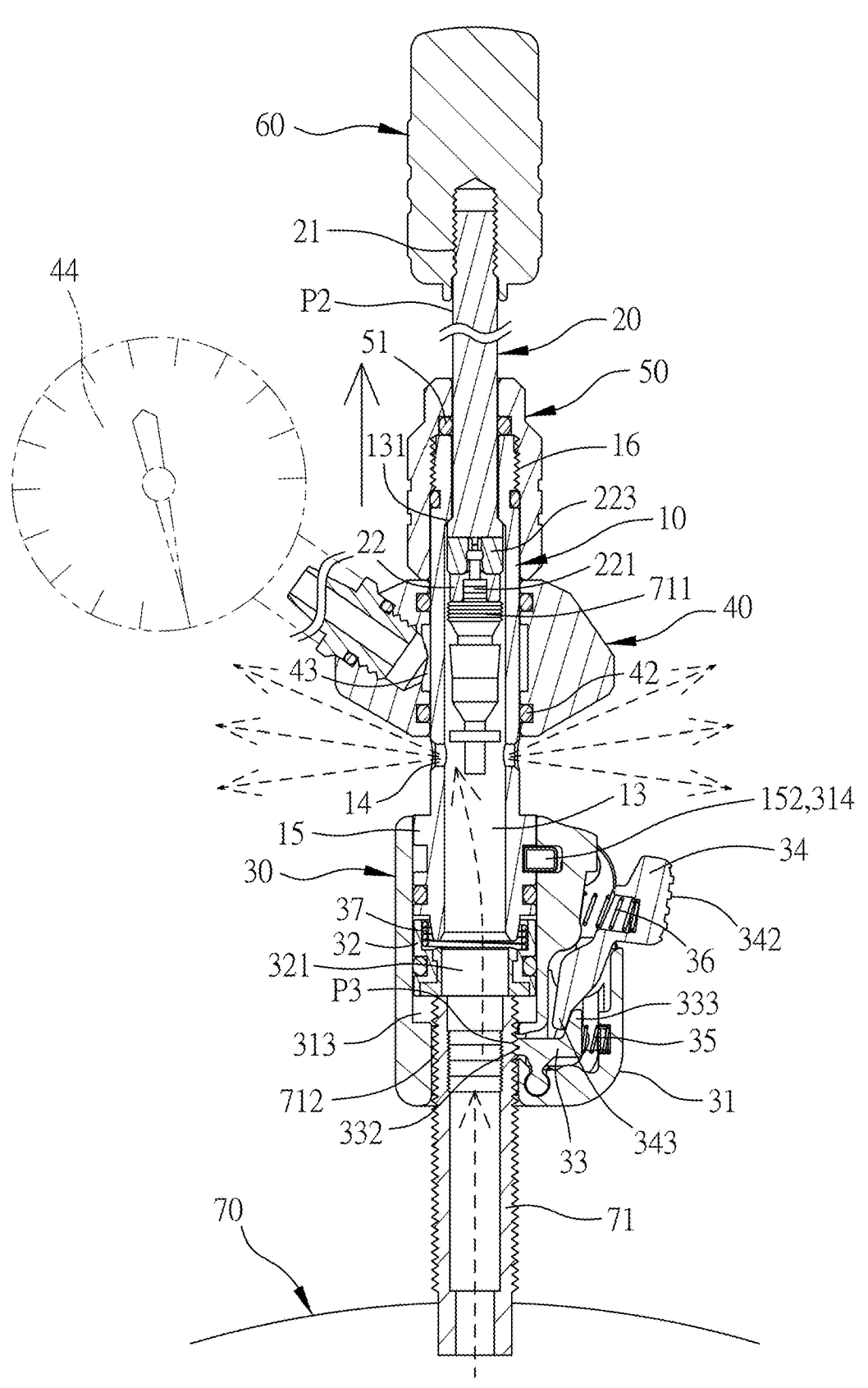
FIG. 8 is still another cross-sectional view showing the operation of the pressure relief tool for the large-size tire according to the preferred embodiment of the present invention.
Figure 9:
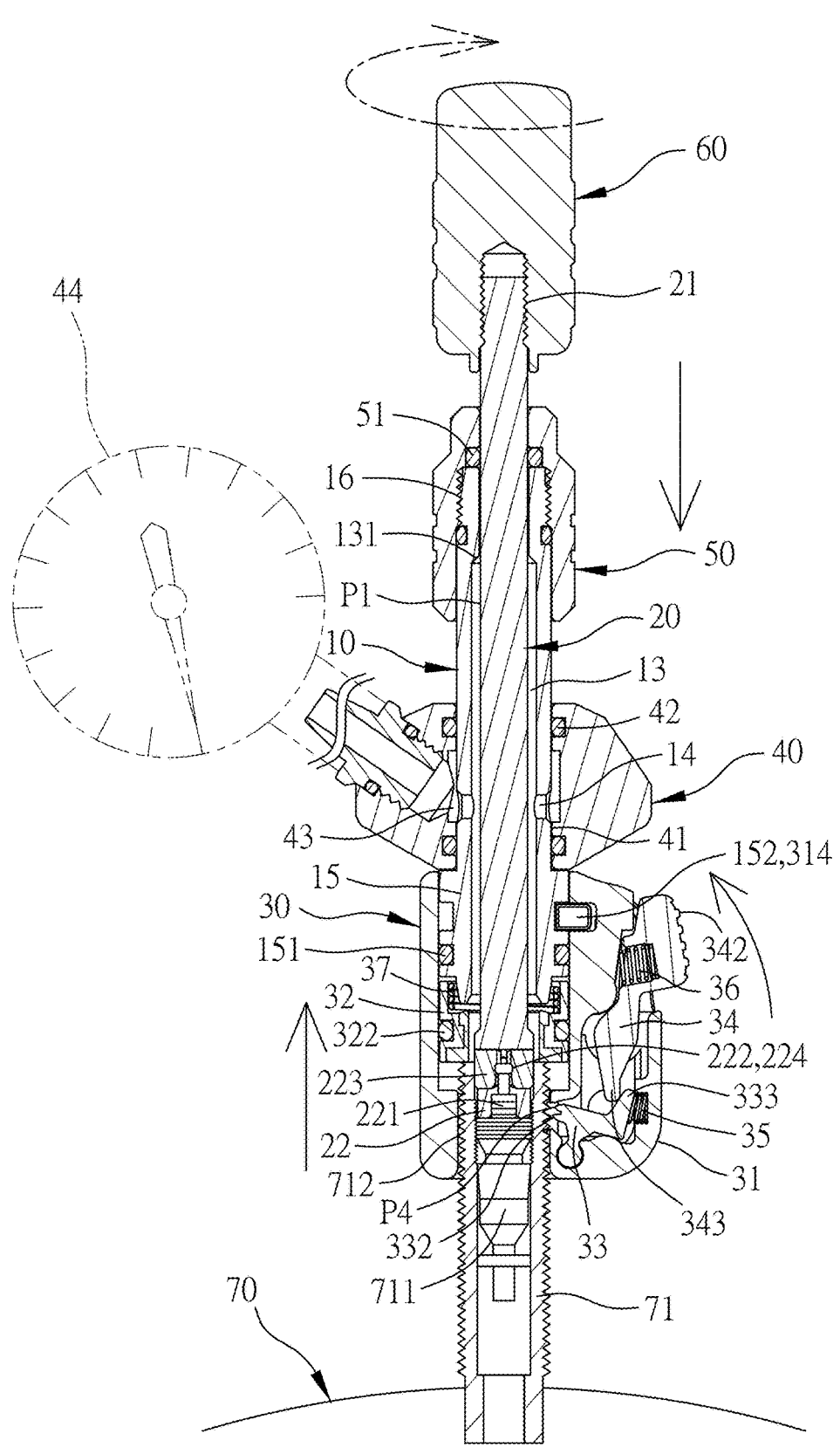
FIG. 9 is another cross-sectional view showing the operation of the pressure relief tool for the large-size tire according to the preferred embodiment of the present invention.

The drive rod 20 is reciprocally moveable and rotatable between a first position P1 (as shown in FIGS. 4, 6 and 9) and a second position P2 (as illustrated in FIGS. 5, 7 and 8) of the fitting tube 10, the drive rod 20 includes a first diameter X1, an operating portion 21 with an end extending out of the second segment 12 of the fitting tube 10, and the drive rod 20 includes a taking portion 22 formed on the other end thereof, wherein the taking portion 22 has a second diameter X2 which is greater than the first diameter X1, when the drive rod 20 is moved to the second position P2, the taking portion 22 is stopped by the defining portion 131, the taking portion 22 has a recess 221 defined on a front end thereof, a notch 222 formed on a bottom of the recess 221, and a flexible block 223 fixed on the taking portion 22, wherein the flexible block 223 has a receiving orifice 224 extending into the notch 222. The taking portion 22 has a trench 225 defined thereon and two locating orifices 226 defined on the trench 225 and communicating with the notch 222, wherein the flexible block 223 is one-piece injection molded on the taking portion 22, and the flexible block 223 has a surround portion 2231 configured to connect with the trench 225, and the flexible block 223 has two engagement portions 2232 configured to connect with the two locating orifices 226, wherein the receiving orifice 224 is defined between the two engagement portions 2232, thus reducing components and saving a connection process.

The valve joint 30 includes a connection seat 31, an air stop ring 32, at least one movable retainer 33, at least one control element 34, at least one returning element 35, 36, and a force spring 37.

The connection seat 31 includes a body 31A, a cap 31B connected with the body 31A, and a chamber 31C defined between a side of the body 31A and the cap 31B, wherein the connection seat 31 has a first connecting orifice 311 defined on an end thereof, a second connecting orifice 312 formed on the other end of the connection seat 31, a channel 313 communicating between the first connecting orifice 311 and the second connecting orifice 312, and a protrusion 314 accommodated in the channel 313, wherein the first connecting orifice 311 is configured to connect with the coupling portion 15 of the fitting tube 10, an inner wall of the channel 313 abuts against the O-ring 151 of the coupling portion 15 to produce an airtight anti-leakage effect. The protrusion 314 is engaged in the annular groove 152 of the coupling portion 15 so that the connection seat 31 is rotatable with respect to the fitting tube 10 but is not removable from the fitting tube 10, the chamber 31C is located beside the first connecting orifice 311, the second connecting orifice 312 and the channel 313, the chamber 31C has a first rotatable connection portion 315 proximate to the second connecting orifice 312, and the chamber 31C has a third rotatable portion 316 adjacent to the channel 313.

The air stop ring 32 is received in the channel 313 but does not block the first connecting orifice 311 and the second connecting orifice 312, and the air stop ring 32 is movable toward the first connecting orifice 311 or the second connecting orifice 312 in the channel 313, wherein the air stop ring 32 has a tunnel 321 defined therein, and the air stop ring 32 has an airtight portion 322 extending outward therefrom and configured to close the channel 313.

In this embodiment, a movable retainer 33 is provided and is located in the chamber 31C of the end of the connection seat 31 close to the second connecting orifice 312, wherein the movable retainer 33 has a second rotatable connection portion 331 formed on a side thereof and configured to rotatably connect with the first rotatable connection portion 315 of the connection seat 31, the movable retainer 33 has a toothed portion 332 formed on an inner wall thereof, and the movable retainer 33 has an actuation portion 333 extending from an outer wall thereof, wherein the toothed portion 332 is controllable to move between an internal position P3 (as shown in FIGS. 4, 6, 7 and 8) and an external position P4 (as illustrated in FIGS. 5 and 9), the internal position P3 is located in the channel 313, and the external position P4 is located outside the channel 313 and in the chamber 31C.

In this embodiment, a control element 34 is provided, wherein the control element 34 is accommodated in the chamber 31C of the connection seat 31, the control element 34 includes a fourth rotatable connection portion 341 configured to rotatably connect with the third rotatable connection portion 316 of the connection seat 31, the control element 34 includes a manual manipulation portion 342 extending from an outer wall thereof and configured to be operated manually, a controlled portion 343 formed on an inner wall thereof and configured to be driven by the actuation portion 333 of the movable retainer 33. When the manual manipulation portion 342 is pressed, the controlled portion 343 drives the actuation portion 333 of the movable retainer 33 to move outward so that the toothed portion 332 of the movable retainer 33 moves between the internal position P3 and the external position P4.

In this embodiment, two returning elements 35, 36 are provided, wherein the two returning elements 35, 36 are fixed among the connection seat 31, the control element 34 and the movable retainer 33, the toothed portion 332 of the movable retainer 33 is normally maintained at the internal position P3, when the manual manipulation portion 342 of the control element 34 is pressed, the two returning elements 35, 36 are pressed so that the actuation portion of the movable retainer 33 is pushed, and the toothed portion 332 of the movable retainer 33 is moved to the external position P4. In this embodiment, the two returning elements 35, 36 are a spring.

The force spring 37 is disposed between the coupling portion 15 of the fitting tube 10 and the air stop ring 32 of the valve joint 30 so as to push the air stop ring 32 to the second connecting orifice 312.

The protrusion 314 is a one-piece injection molded with the cap 31B, when the cap 31B is connected with the body 31A, the protrusion 314 is engaged in the annular groove 152 of the coupling portion 15 to be fixed, and the coupling portion 15 of the fitting tube 10, the air stop ring 32, the movable retainer 33, the control element 34, the two returning elements 35, 36 and the force spring 37 are mounted in the connection seat 31.

The slidable sleeve 40 includes a slide orifice 41, two first airtight rings 42 engaged on an inner wall of the slide orifice 41, and a passageway 43 defined between the two airtight rings 42 of the inner wall of the slide orifice 41, wherein the slidable sleeve 40 is slidably fixed on the fitting tube 10 by using the slide orifice 41, and the slidable sleeve 40 is configured to connect with an air pressure gauge 44 which is in communicating with the passageway 43, when the slidable sleeve 40 is slid to a corresponding air orifice 14, the air pressure gauge 44 is communicated with the at least one air orifice 14.

The grip element 50 is hollow, connected with the fixing portion 16 of the fitting tube 10, and configured to be held, wherein the grip element 50 includes a second airtight ring 51 configured to abut against the drive rod 20, thus producing an airtight anti-leakage effect.

The operational element 60 is connected with the operating portion 21 of the drive rod 20 and is configured to facilitate an operation of the drive rod 20.

Referring to FIGS. 5, the pressure relief tool is configured to connect with an air valve 71 of the large-size tire 70 to release an air pressure, wherein the air valve 71 includes an air valve 711 configured to control a flowing of airs of the large-size tire 70, and the air valve 71 has a threaded section 712 formed adjacent to an outer wall of an end thereof. In operation, a connector 31 of the valve joint 30 is fitted with the air valve 71 by using a second connecting orifice 312 so that the end of the air valve 71 is inserted into the channel 313 from the second connecting orifice 312 manually, the toothed portion 332 of the movable retainer 33 is pushed by the threaded section 712 and the two returning elements 35, 36 to be opened between the internal position P3 and the external position P4, hence the air valve 71 is inserted into a predetermined position easily, the toothed portion 332 of the movable retainer 33 is automatically engaged with the threaded section 712 of the air valve 71, and the end of the air valve 71 abuts against the airtight ring 32 to press the force spring 37 so that the airtight anti-leakage effect produces between the end of the air valve 71 and the airtight ring 32.

As shown in FIG. 6, when the drive rod 20 is pushed and pulled to move to the first position P1, the recess 221 of the taking portion 22 is engaged with the air valve 711 of the air valve 71 so that a part of the air valve 711 is inserted into the notch 222 of the taking portion 22 to be received in the receiving orifice 224 of the flexible block 223, and the flexible block 223 flexibly moves back to engage the air valve 711 so that the air valve 711 is connected with the taking portion 22 securely, then the operational element 60 drives the drive rod 20 to rotate so that the drive rod 20 actuates the air valve 711 to revolve, and the air valve 711 is removably rotated with respect to the air valve 71 until to be removed from the air valve 71.

As illustrated in FIG. 7, the slidable sleeve 40 is moved to correspond to one air orifice 14 so that the passageway 43 of the slidable sleeve 40 is in communication with the air conduit 13 via the at least one air orifice 14. The drive 20 is pushed and pulled to move toward the second position P2 so as to drive the air valve 711 to remove from the air valve 71, and the air conduit 13 of the fitting tube 10 communicates with the air valve 71 and an interior of the large-size tire 70 completely via the tunnel 321 of the air stop ring 32, hence an air pressure value of the interior of the large-size tire 70 is measured by the air pressure gauge 44.

With reference to FIG. 8, the slidable sleeve 40 is slid to move across the one corresponding air orifice 14 so that the corresponding one air orifice 14 of the fitting tube 10 is communicated with an external environment, and an air pressure of the interior of the large-size tire 70 is discharged out of the at least one air orifice 14 of the fitting tube 10 via the air valve 71, the tunnel 321 of the air stop ring 32 and the air conduit 13 of the fitting tube 10, thus releasing the air pressure quickly. Also, when releasing the air pressure, the slidable sleeve 40 is slid to correspond to the one corresponding air orifice 14 so as to control the air pressure valve of the interior of the large-size tire 70 by way of the air pressure gauge 44.

With reference to FIG. 9, when the air pressure of the large-size tire 70 is released to a predetermined valve, the slidable sleeve 40 is slid to the corresponding air orifice 14 to close the at least one air orifice 14 of the fitting tube 10, and the drive rod 20 is pushed and pulled to move toward the first position P1 so that the recess 221 of the taking portion 22 is engaged with the air valve 711 of the air valve 71, and a part of the air valve 711 is inserted into the notch 222 of the taking portion 22 to be received in the receiving orifice 224 of the flexible block 223, then the flexible block 223 flexibly moves back to engage the air valve 711 so that the air valve 711 is connected with the taking portion 22 securely, the operational element 60 drives the drive rod 20 to rotate reversely so that the taking portion 22 actuates the air valve 711 to revolve, and the air valve 711 is screwed with the air valve 71, thus closing the air valve 71. Thereafter, the manual manipulation portion 342 of the control element 34 is pressed so that the control element 34 presses the returning element 36, wherein the controlled portion 343 of the control element 34 rotates along the fourth rotatable rotation portion 341 so as to move the actuation portion 333 of the movable retainer 33, and the movable retainer 33 forces the returning element 35. The toothed portion 332 of the movable retainer 33 rotates along the second rotatable connection portion 331 so as to move to the external position P4 from the internal position P3, and valve joint 30 is removed from the air valve 71, thus detaching the pressure relief tool from the air valve 71.

Accordingly, the pressure relief tool of the present invention has advantages as follows:

The valve joint 30 is connected with the air valve 71 of the large-size tire 70 to release the air pressure. In addition, after releasing the air pressure of the large-size tire 70, the valve joint 30 is removed from the air valve 71 with one hand easily. Preferably, the air pressure of the large-size tire 70 is released to the predetermined value easily and quickly by using the fitting tube 10, the drive rod 20 and the slidable sleeve 40, thus obtaining easy, time-saving, and labor-saving effects.

While the first embodiments of the invention have been set forth for the purpose of disclosure, modifications of the disclosed embodiments of the invention as well as other embodiments thereof may occur to those skilled in the art. The scope of the claims should not be limited by the first embodiments set forth in the examples, but should be given the broadest interpretation consistent with the description as a whole.

What is claimed is:

1. A pressure relief tool for a large-size tire is connected with an air valve of the large-size tire, the air valve assembly including an air valve member configured to control a flowing of airs of the large-size tire, the pressure relief tool comprising:

a fitting tube including a first segment, a second segment opposite to the first segment, and an air conduit communicating with the first segment and the second segment, wherein the fitting tube further includes at least one air orifice defined between the first segment and the second segment, and the fitting tube further includes a coupling portion formed on the first segment;

a drive rod being reciprocally moveable and rotatable between a first position and a second position of the fitting tube, wherein the drive rod includes an operating portion with an end extending out of the second segment of the fitting tube, and the drive rod includes a taking portion formed on the other end thereof, wherein when the drive rod is moved to the first position, the taking portion is connected with the air valve member and can drive the air valve member to rotate so that the air valve member is separated from the air valve assembly or connected to the air valve assembly, and when the drive rod actuates the air valve member to locate at the second position, an interior of the large-size tire is in communication with an external environment via the air valve assembly, the air conduit, and the at least one air orifice;

a valve joint including a connection seat, an air stop ring, at least one movable retainer, and at least one returning element;

wherein the connection seat has a first connecting orifice defined on an end thereof, a second connecting orifice formed on the other end of the connection seat, and a channel communicating between the first connecting orifice and the second connecting orifice, wherein the first connecting orifice is configured to connect with the coupling portion of the fitting tube, and the second connecting orifice is configured to accommodate the air valve assembly;

wherein the air stop ring is received in the channel but does not block the first connecting orifice and the second connecting orifice, and the air stop ring is movable toward the first connecting orifice or the second connecting orifice in the channel, wherein the air stop ring has a tunnel defined therein, and the air stop ring has an airtight portion extending outward therefrom and configured to close the channel;

wherein the at least one movable retainer is rotatably connected on the end of the connection seat close to the second connecting orifice, the at least one movable retainer has a toothed portion formed on an inner wall thereof, and the toothed portion is controllable to move between an internal position and an external position, the internal position is located in the channel, and the external position is located outside the channel;

wherein the at least one returning element is configured to abut against the at least one movable retainer so that the toothed portion is normally maintained at the internal position, and when an actuation portion of the at least one movable retainer is controlled, the toothed portion of the at least one movable retainer is moved to the external position; and wherein a slidable sleeve is slidably fixed on the fitting tube, and the slidable sleeve is configured to connect with an air pressure gauge, when the slidable sleeve is slid to correspond to a corresponding air orifice of the at least one air orifice, the air pressure gauge is communicated with the at least one air orifice so as to measure an air pressure value of the interior of the large-size tire.

2. The pressure relief tool as claimed in claim 1, wherein the channel of the connection seat accommodates a protrusion, the coupling portion of the fitting tube has an O-ring engaged on an outer wall thereof, and the coupling portion has an annular groove formed on the outer wall thereof, an inner wall of the channel abuts against the O-ring of the coupling portion to produce an airtight anti-leakage effect, and the protrusion is engaged in the annular groove of the coupling portion so that the connection seat is rotatable with respect to the fitting tube but is not removable from the fitting tube.

3. The pressure relief tool as claimed in claim 1, wherein the taking portion has a recess defined on a front end thereof, a notch formed on a bottom of the recess, and a flexible block fixed on the taking portion, wherein the taking portion has a trench defined thereon and two locating orifices defined on the trench and communicating with the notch, the flexible block is one-piece injection molded on the taking portion, the flexible block has a surround portion configured to connect with the trench, and the flexible block has two engagement portions configured to connect with the two locating orifices, wherein the flexible block has a receiving orifice defined between the two engagement portions and extending into the notch.

4. The pressure relief tool as claimed in claim 1, wherein the slidable sleeve includes a slide orifice, two first airtight rings engaged on an inner wall of the slide orifice, and a passageway defined between the two airtight rings of the inner wall of the slide orifice, wherein the slidable sleeve is slidably fixed on the fitting tube by using the slide orifice, and the air pressure gauge is in communicated with the passageway.

5. The pressure relief tool as claimed in claim 1, wherein the fitting tube includes a fixing portion formed on the second segment, the grip element is hollow, connected with the fixing portion of the fitting tube, and configured to be held, wherein the grip element includes a second airtight ring configured to abut against the drive rod, thus producing an airtight anti-leakage effect.

6. The pressure relief tool as claimed in claim 1 further comprising an operational element which is connected with the operating portion of the drive rod and is configured to facilitate an operation of the drive rod.

7. The pressure relief tool as claimed in claim 1, wherein the air conduit of the fitting tube includes a defining portion formed proximate to the second segment and having a decreased diameter, the drive rod includes a first diameter, and the taking portion has a second diameter which is greater than the first diameter, when the drive rod is moved to the second position, the taking portion is stopped by the defining portion, thus limiting the drive rod.

8. The pressure relief tool as claimed in claim 1, wherein the valve joint includes at least one control element, and the at least one control element is forced by the at least one returning element, wherein the control element includes a manual manipulation portion extending from an outer wall thereof and configured to be operated manually, a controlled portion formed on an inner wall thereof and configured to be driven by the actuation portion of the movable retainer; when the manual manipulation portion is pressed, the controlled portion drives the actuation portion of the movable retainer to move outward so that the toothed portion of the movable retainer moves between the internal position and the external position.

9. The pressure relief tool as claimed in claim 1, wherein the force spring is disposed between the coupling portion of the fitting tube and the air stop ring of the valve joint so as to push the air stop ring to the second connecting orifice.

* * * * *